Aug. 25, 1931.  J. F. POWELL  1,820,323
FASTENER
Filed Oct. 11, 1928
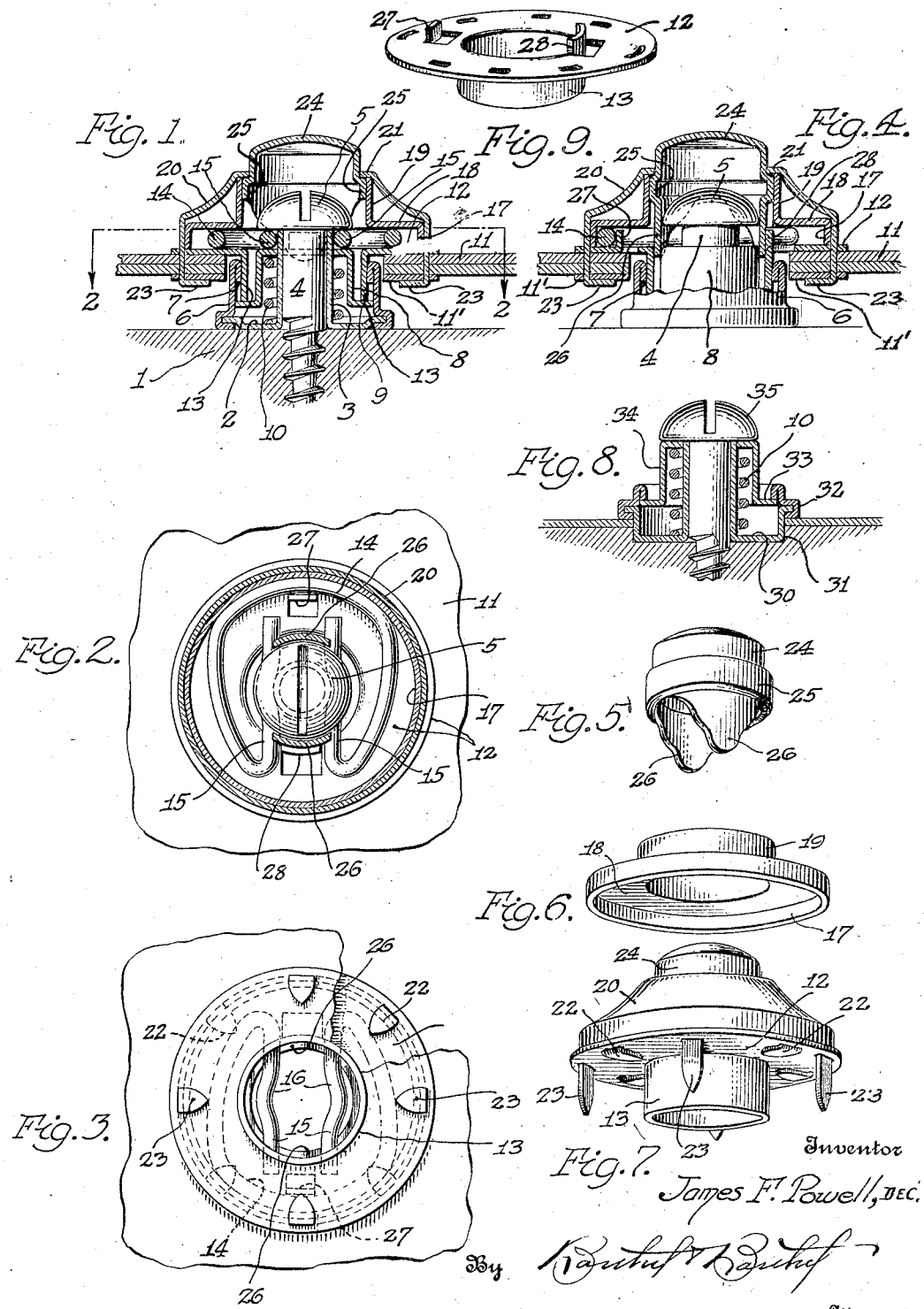
Inventor
James F. Powell, DEC.
By
Attorneys Patented Aug. 25, 1931

1,820,323

UNITED STATES PATENT OFFICE

JAMES F. POWELL, DECEASED, LATE OF FLINT, MICHIGAN, BY DELBERT J. POWELL, ADMINISTRATOR, OF FLINT, MICHIGAN

FASTENER

Application filed October 11, 1928. Serial No. 311,794.

The present invention relates to a fastener which may be advantageously used in connection with automobiles for securing a curtain to a part of the automobile body. The fastener may be conceived as consisting of two parts, a fixed structure and a movable structure, the former being carried permanently by a part of the automobile body, and the latter being carried by a movable element such as fabric and adapted for locking and unlocking with respect to the fixed part. Obviously, the device may be employed in other similar relations where one member is to be attached to another.

The principal object of the invention is to provide a positive lock between the two above mentioned parts, which, however, may be opened by a slight pressure of the thumb on an operating button. The movable element of the fastener is grasped between and lifted by the fore and middle fingers, and when the hand is in this position, the thumb naturally lies on the button.

The locking action occurs through a pair of spring fingers carried by the movable element and adapted to extend beneath the head of a stud carried by the body or supporting member. The button mentioned above is also carried by the fixed element and is provided with a wedge device adapted to spread the spring fingers beyond the head in order to pass the same.

The invention is fully disclosed by way of example in the following description and in the accompanying drawings in which Figure 1 is a transverse section of the fastener in locking position;

Fig. 2 is a plan section on the line 2—2 of Fig. 1;

Fig. 3 is a bottom plan section of the movable portion, removed from the fixed portion;

Fig. 4 is a transverse section, partly in elevation, at right angles to Fig. 1;

Fig. 5 is a perspective view of the operating button and spreader;

Fig. 6 is a perspective view of the spring retaining device;

Fig. 7 is a perspective view of the movable portion of the fastener;

Fig. 8 is a transverse section of a modified fixed structure; and

Fig. 9 is a perspective view of the spring holder.

Reference to these views will now be had by use of like characters which are employed to designate corresponding parts throughout.

The numeral 1 in Fig. 1 designates a fixed support, such as a part of an automobile body, to which an element such as an automobile curtain is to be applied by means of a fastener. On the surface of the supporting member 1 is mounted a base member 2 having a central up-standing boss 3. A stud 4 is passed through the boss and threaded into the support, and the stud further has a head 5 engaging the upper end of the boss and thus retaining the base member on the support. To the margin of the base member 2 is secured a wall member 6 having its upper edge doubled inwardly to form a stop shoulder 7. A follower 8 is slidable on the boss 3 and has at its lower edge an outwardly extending flange 9 adapted to engage the shoulder 7, which thus forms the upper limit of the travel of the follower. Within the follower and around the boss 3 is mounted a coil spring 10 resting on the base 2 and tending to move the follower towards the head 5 or shoulder 7. The parts thus far described are inseparable from the support 1 and may be regarded as the base structure or the fixed portion of the fastener.

The numeral 11 indicates the fabric or other member which is to be secured to the support 1 by means of the fastener. A flat annular holder 12 lies on the member 11 and has a downward boss or skirt 13 slidable within the wall 6 and resting on the lower flange 9 of the follower. Upon this holder rests a spring wire 14, the ends 15 of which are turned inwardly to constitute spring fingers adapted to engage the boss 3 beneath the head 5. The configuration of the spring wire 14 is such that the fingers 15 normally tend to press against the boss 3, and the fingers may be indented at 16 to accommodate the boss. Upon the holder is mounted a retaining device consisting of a ring portion 17 enclosing the spring wire, an annular disk portion 18 resting on the spring wire, and an upwardly extending sleeve or guide 19 at the inner edge of the portion 18. The spring holder, spring wire and retaining device are secured together and to the member 11 by means of an enclosing shell 20 which tapers upwardly to approximately the diameter of the sleeve 19 and is formed at its upper edge with a flange 21 extending across the upper edge of the sleeve. The lower edge of the shell carries a series of short prongs 22 which alternate with longer prongs 23. The former pass through and are bent directly beneath the bottom of the holder 12, as shown in Fig. 7, while the latter pass through and secure a retaining plate 11' beneath the member 11 as shown more clearly in Figs. 2 and 4.

Finally, a button 24 is slidably mounted in the upper end of the shell and has a portion 25 of enlarged circumference disposed beneath the flange 21 whereby the button cannot be withdrawn from the shell 20. The button is formed with a pair of spaced, downwardly extending wedge members 26 received by the fingers 15 and adapted to space them, on inward movement of the button, to an extent sufficient to clear the head 5.

The flat portion 12 of the spring holder has a pair of upstruck lugs 27 and 28, the former engaging the back of the wire 14 at substantially the center thereof, and the latter extending between the fingers 15. This construction holds the spring wire from turning bodily around the stud 4.

In the operation of the device, assuming that the fastener is locked and is to be unlocked, the shell 20 is grasped between the fore and middle fingers, and the button 24 is depressed. The wedge members 26 spread the fingers 15 in the manner already indicated, beyond the perimeter of the head 5, whereupon the movable part of the fastener together with the member 11 may be withdrawn. The follower 8, being under spring tension towards the head, tends to move the shell and associated parts away from the head as soon as the fingers 15 are sufficiently spread. The follower is retained against disengagement from the base structure by contact with the under side of the head 5 or with the shoulder 7. In attaching the movable portion of the fastener to the fixed portion, the fingers are spread in the manner already described in order to pass the head 5. At the same time, the skirt 13 of the holder 12 depresses the follower 8 against the action of the spring 10. When the locking spring 14 has reached the proper plane, the button 24 is released in order to permit them to spring beneath the head 5. Or, the movable portion may be applied without pressing the button, merely by forcing the fingers over the head 5 until they snap beneath the lower face of the latter.

In Fig. 8 is illustrated a modified construction of the fixed portion which permits the member 11 to approach nearer to the support. The base member 30 is seated in a countersunk 31 in the support 1, and a short wall member 32 is secured to the base member. The upper edge of the wall member is likewise turned inwardly to form a stop shoulder 33 for the follower 34 which is mounted therein in the manner described in connection with the other modification. Inasmuch as the head 35 is brought nearer to the surface of member 1, due to the fact that the stud passes through the countersunk opening 31, the movable portion of the fastener and the member 11 carried thereby may be brought correspondingly nearer to the surface of the base 1. The shorter extent of the wall member 32 above the surface of the member 1 permits the holder 12, 13 to be brought to a correspondingly lower position.

Although specific embodiments of the invention have been illustrated and described, it will be apparent that various alterations in the details of construction may be made without departing from the scope of the invention as indicated by the appended claims.

What is claimed is:—

1. A fastener comprising a stud having a head thereon, a base member surrounding said stud and held thereby, a follower surrounding said stud, a coil spring tending to move said follower towards said head, stop means fixed to said base and engageable by said follower to prevent separation of said follower from said base, a relatively movable shell adapted for attachment to a fabric, a spring device within said shell and having a pair of spring fingers adapted to lie upon said follower and to extend beneath said head, a button slidable in said shell, and wedge members carried by said button and adapted to pass between and to spread said fingers.

2. A fastener comprising a stud having a head thereon, a base member surrounding said stud and held thereby, a follower surrounding said stud, a coil spring tending to move said follower towards said head, a relatively movable shell adapted for attachment to a fabric, a retaining device mounted within said shell, a holder movable by said follower relatively to said stud and adapted for attachment to the fabric, a spring device extending into said retaining device and resting on said holder, a pair of spring fingers included in said spring device and adapted to lie upon said follower and to extend beneath said head, a button slidable in said shell, and wedge members carried by said button and adapted to pass between and to spread said fingers.

3. A fastener comprising a stud having a head thereon, a base member surrounding said stud and held thereby, a follower surrounding said stud, a coil spring tending to move said follower towards said head, a relatively movable shell adapted for attachment to a fabric, a holder movable by said follower relatively to said stud and adapted for attachment to the fabric, a spring wire within said shell and resting on said holder, said wire having inturned fingers adapted to lie upon said follower and to extend beneath said head, a button slidable in said shell, and wedge members carried by said button and adapted to pass between and to spread said fingers.

4. A fastener comprising a stud having a head thereon, a base member surrounding said stud and held thereby, a follower surrounding said stud, a coil spring tending to move said follower towards said head, a relatively movable shell adapted for attachment to a fabric, a holder movable by said follower relatively to said stud and adapted for attachment to the fabric, a spring wire within said shell and resting on said holder, said wire having inturned fingers adapted to lie upon said follower and to extend beneath said hand, lugs struck up from said holder and retaining said spring wire against shifting, a button slidable in said shell, and wedge members carried by said button and adapted to pass between and to spread said fingers.

In testimony whereof I, the administrator of the estate of JAMES F. POWELL, affix my signature.

DELBERT J. POWELL,
*Administrator for the Estate of James F. Powell, Deceased.*